(12) United States Patent
Suzuki et al.

(10) Patent No.: US 11,442,453 B2
(45) Date of Patent: Sep. 13, 2022

(54) INFORMATION PROCESSING APPARATUS, INFORMATION PROCESSING METHOD AND INFORMATION PROCESSING PROGRAM

(71) Applicant: TOYOTA JIDOSHA KABUSHIKI KAISHA, Toyota (JP)

(72) Inventors: Koichi Suzuki, Miyoshi (JP); Toru Nishitani, Nisshin (JP); Jun Usami, Toyota (JP); Minami Yoda, Tokyo (JP); Kensuke Koike, Nisshin (JP); Tsuyoshi Ogawa, Okazaki (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/812,730

(22) Filed: Mar. 9, 2020

(65) Prior Publication Data
US 2020/0310438 A1    Oct. 1, 2020

(30) Foreign Application Priority Data
Mar. 26, 2019   (JP) .............................. JP2019-058468

(51) Int. Cl.
*G05D 1/02* (2020.01)
*G01C 21/34* (2006.01)
*G01S 19/42* (2010.01)

(52) U.S. Cl.
CPC ....... *G05D 1/0212* (2013.01); *G01C 21/3415* (2013.01); *G01S 19/42* (2013.01)

(58) Field of Classification Search
CPC .... G05D 1/0212; G01C 21/3415; G01S 19/42

USPC .......................................................... 701/25
See application file for complete search history.

(56) References Cited

U.S. PATENT DOCUMENTS

| | | | |
|---|---|---|---|
| 9,489,490 B1* | 11/2016 | Theobald | G16H 20/13 |
| 9,798,995 B1* | 10/2017 | Soundararajan | G06Q 10/083 |
| 10,120,384 B2 | 11/2018 | Wilkinson et al. | |
| 10,233,021 B1* | 3/2019 | Brady | G05D 1/0282 |

(Continued)

FOREIGN PATENT DOCUMENTS

| | | |
|---|---|---|
| CN | 106372827 A | 2/2017 |
| CN | 107111948 A | 8/2017 |

(Continued)

OTHER PUBLICATIONS

Mihai et al., "Autonomous Grocery Delivery Service in Urban Areas," 2017, Publisher: IEEE.*

(Continued)

*Primary Examiner* — Tuan C To
(74) *Attorney, Agent, or Firm* — Sughrue Mion, PLLC

(57) ABSTRACT

An information processing apparatus manages operation of an autonomous vehicle that delivers a package. The information processing apparatus includes a control section that before the autonomous vehicle arrives at a basic delivery destination that is an original delivery destination of the package, acquires a location, at a planned delivery time of the package, of a user that receives the package, and where the location is different from the basic delivery destination, transmits an instruction for delivering the package to the location to the autonomous vehicle.

7 Claims, 5 Drawing Sheets

(56) References Cited

U.S. PATENT DOCUMENTS

| | | | |
|---|---|---|---|
| 10,453,021 B1* | 10/2019 | Evans | G06Q 10/083 |
| 10,457,392 B1* | 10/2019 | Evans | G06Q 10/083 |
| 10,495,471 B2* | 12/2019 | Sweeney | G01C 21/3476 |
| 10,677,603 B1* | 6/2020 | Kelly | G08G 1/127 |
| 10,789,568 B2* | 9/2020 | Greenberger | G06Q 10/08355 |
| 11,164,138 B2* | 11/2021 | Kline | G06Q 10/083 |
| 2002/0156645 A1* | 10/2002 | Hansen | G06Q 30/0601 |
| | | | 705/26.1 |
| 2013/0240673 A1* | 9/2013 | Schlosser | B64C 39/024 |
| | | | 701/3 |
| 2013/0332008 A1* | 12/2013 | Herman | B64C 39/024 |
| | | | 701/2 |
| 2014/0278099 A1* | 9/2014 | Schenken | G06Q 10/06312 |
| | | | 701/533 |
| 2015/0120094 A1* | 4/2015 | Kimchi | G06Q 30/0641 |
| | | | 701/3 |
| 2017/0024688 A1 | 1/2017 | Wiechers | |
| 2018/0164818 A1* | 6/2018 | Wilkinson | G05D 1/0278 |
| 2018/0281657 A1 | 10/2018 | Healey et al. | |
| 2019/0041864 A1* | 2/2019 | Konishi | H04W 4/44 |
| 2019/0147401 A1* | 5/2019 | Bash | G05D 1/101 |
| | | | 701/3 |
| 2019/0212735 A1* | 7/2019 | Fujiwara | G05D 1/0212 |
| 2019/0236667 A1* | 8/2019 | Phillips | B64C 39/024 |
| 2019/0250636 A1* | 8/2019 | Szubbocsev | G08G 1/202 |
| 2020/0201354 A1* | 6/2020 | Beaurepaire | B60W 60/00256 |
| 2020/0249042 A1* | 8/2020 | Warr | G06Q 50/30 |

FOREIGN PATENT DOCUMENTS

| | | | | |
|---|---|---|---|---|
| CN | 109478371 A | * | 3/2019 | G05D 1/0291 |
| EP | 3453617 A1 | * | 3/2019 | G05D 1/0044 |
| JP | 2014-48081 A | | 3/2014 | |
| JP | 6164599 B1 | | 7/2017 | |
| JP | 2019-28862 A | | 2/2019 | |
| WO | 2016/054200 A1 | | 4/2016 | |
| WO | WO-2016054200 A1 | * | 4/2016 | G06F 21/60 |
| WO | WO-2016099623 A1 | * | 6/2016 | G06Q 10/083 |
| WO | WO-2018160724 A1 | * | 9/2018 | G01C 21/3492 |
| WO | WO-2019046110 A1 | * | 3/2019 | G05D 1/0297 |

OTHER PUBLICATIONS

M.R. Haque et al., "Autonomous Quadcopter for Product Home Delivery," 2014, Publisher: IEEE.*
Kevin et al., "Vehicle Routing Problems for Drone Delivery," 2017, vol. 47, Publisher: IEEE.*

* cited by examiner

| VEHICLE ID | TRAVEL ROUTE | POSITION INFORMATION | RECEPTION TIME/DATE | START TIME | PACKAGE ID | DELIVERY DESTINATION | CONTACT INFORMATION | DELIVERY TIME | STATUS |
|---|---|---|---|---|---|---|---|---|---|
| S001 | ◇◇◇◇ | ---- | ---------- | yy:yy | xxxx | A | ---- | ○○○○ | DELIVERED |
| | | | | | xxxx | B | ---- | ○○○○ | UNDER DELIVERY |

INFORMATION PROCESSING APPARATUS, INFORMATION PROCESSING METHOD AND INFORMATION PROCESSING PROGRAM

INCORPORATION BY REFERENCE

The disclosure of Japanese Patent Application No. 2019-058468 filed on Mar. 26, 2019 including the specification, drawings and abstract is incorporated herein by reference in its entirety.

BACKGROUND

1. Technical Field

The disclosure relates to an information processing apparatus, an information processing method and an information processing program.

2. Description of Related Art

In recent years, techniques for transporting packages, users and the like via, e.g., a vehicle or train that can autonomously travel have been developed. For example, Japanese Patent No. 6164599 proposes a technique for making a vehicle with a package loaded therein autonomously travel to a delivery locker at a delivery destination and putting the package loaded in the vehicle into the delivery locker.

SUMMARY

Here, for example, like in the case where no reception equipment such as a delivery locker is provided at a delivery destination of a package, where a user (e.g., a recipient himself/herself, a member of the recipient's family or a colleague of the recipient) receives a package himself/herself, the user needs to wait at a delivery destination until completion of reception of the package. Movement of the user is restricted for this reason, which may result in a decrease in convenience for the user. Also, where the user moves from the delivery destination, delivering the package again, what is called "redelivery", is necessary, which may cause a decrease in delivery efficiency.

The present disclosure has been made in view of the aforementioned actual circumstances and an object of the present disclosure is to provide a technique enabling, where a package is delivered using an autonomous vehicle, curbing a decrease in convenience for a user who receives a package and a decrease in delivery efficiency for the autonomous vehicle.

The present disclosure provides an information processing apparatus for managing operation of an autonomous vehicle that delivers a package. The apparatus includes a control section that before the autonomous vehicle arrives at a basic delivery destination that is an original delivery destination of the package, acquires a location, at a planned delivery time of the package, of a user that receives the package, and where the location is different from the basic delivery destination, transmits an instruction for delivering the package to the location to the autonomous vehicle.

The present disclosure can be regarded as providing an information processing method for managing operation of an autonomous vehicle that delivers a package. In such case, the information processing method according to the present disclosure may be a method including causing a computer to perform a step of, before the autonomous vehicle arrives at a basic delivery destination that is an original delivery destination of the package, acquiring a location, at a planned delivery time of the package, of a user that receives the package and a step of, where the location is different from the basic delivery destination, transmitting an instruction for delivering the package to the location to the autonomous vehicle.

The present disclosure can be regarded as providing an information processing program for managing operation of an autonomous vehicle that delivers a package or a non-transitory storage medium storing the information processing program. The information processing program in such case may be a program causing a computer to perform a step of, before the autonomous vehicle arrives at a basic delivery destination that is an original delivery destination of the package, acquiring a location, at a planned delivery time of the package, of a user that receives the package and a step of, where the location is different from the basic delivery destination, transmitting an instruction for delivering the package to the location to the autonomous vehicle.

The present disclosure enables, where a package is delivered using an autonomous vehicle, curbing a decrease in convenience for a user that receives the package and a decrease in delivery efficiency for the autonomous vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
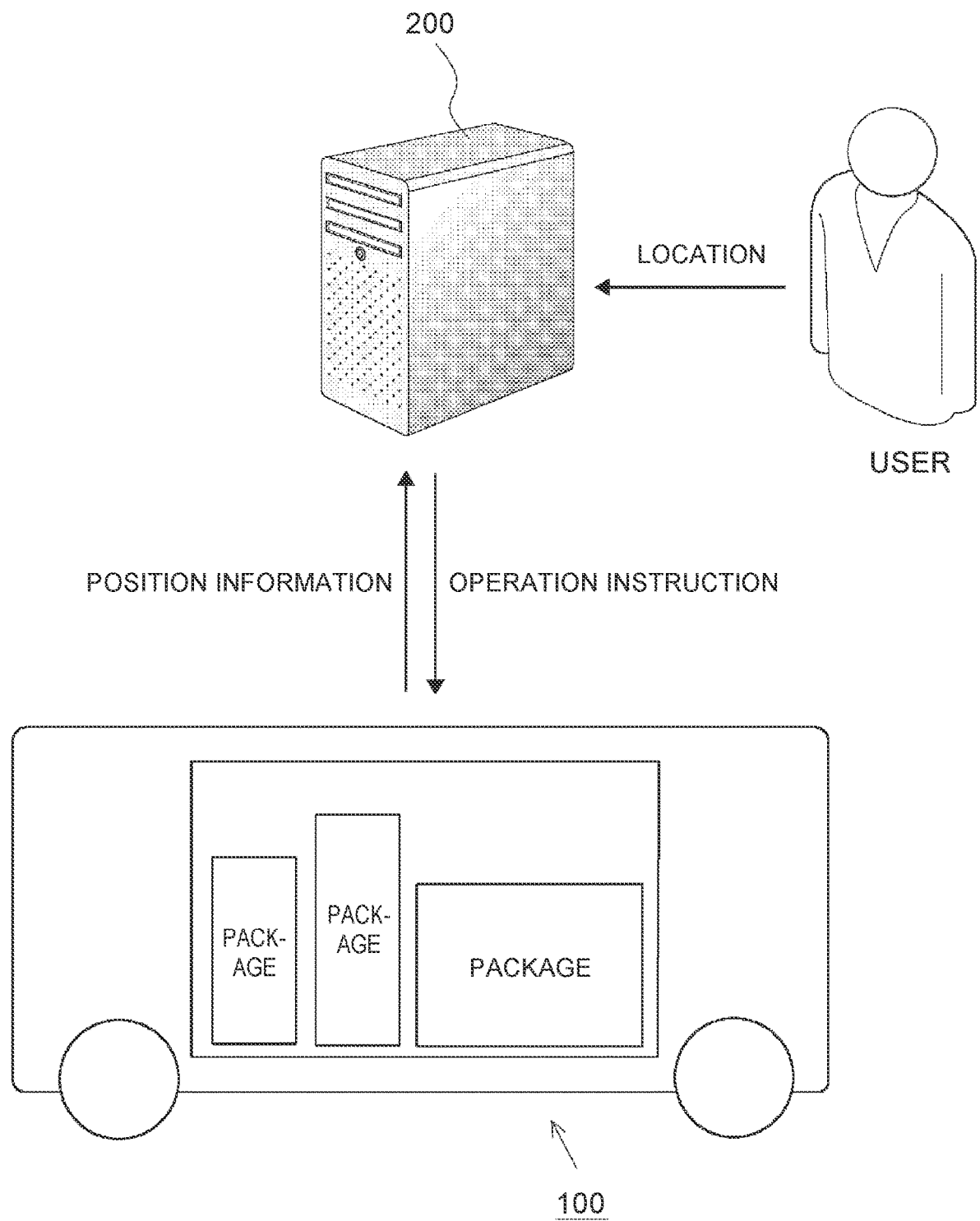
FIG. 1 is a diagram illustrating a schematic configuration of a system that provides a transportation service using an autonomous vehicle.

The present disclosure provides an information processing apparatus that manages operation of an autonomous vehicle. The autonomous vehicle to be managed by the information processing apparatus is a vehicle that can autonomously travel on a road. Where a package is delivered by such autonomous vehicle, there is no need for a driver to ride in the vehicle, enabling reduction in cost of transportation of the package.

However, for example, like in the case where no reception equipment such as a delivery locker is provided at a delivery destination of a package, where a user (e.g., a recipient of a package, a member of the recipient's family or a colleague of the recipient) needs to receive a package himself/herself, the user needs to wait at a delivery destination in order to receive the package, which may restrict movement of the user. Also, where the user moves from the delivery destination before reception of the package, it is necessary to redeliver the package. Consequently, convenience for the user may be decreased and delivery efficiency for the autonomous vehicle may be decreased.

Therefore, the information processing apparatus according to the present disclosure acquires a location, at a planned delivery time of the package, of a user that receives a package (hereinafter may also be referred to as "user location") before an autonomous vehicle arrives at an original delivery destination (basic delivery destination) of the package. Examples of the "before an autonomous vehicle arrives at a basic delivery destination" mentioned here include, e.g., a timing at which time left before the planned delivery time of the package becomes no more than a predetermined length of time, a timing at which a position of the autonomous vehicle enters a range that is a predetermined distance from the basic delivery destination and a timing at which the autonomous vehicle departs from a predetermined departure point (for example, a distribution center or a delivery destination of a package delivered last) toward the basic delivery destination. If the user location thus acquired is different from the basic delivery destination, a control section transmits an instruction for delivering the package to the user location to the autonomous vehicle. Consequently, the autonomous vehicle can change the delivery destination of the package from the basic delivery destination to the user location. Then, the user can receive the package delivered to the user location by the autonomous vehicle. Therefore, according to the present disclosure, even where a user moves from a basic delivery destination of a package before reception of the package, it is possible to deliver the package to a destination of the movement, enabling curbing of restricting movement of the user and an autonomous vehicle performing redelivery. As a result, a decrease in convenience for the user and a decrease in delivery efficiency for the autonomous vehicle are also curbed.

Note that if the user location is excessively distant from an original planned travel route including the basic delivery destination, the autonomous vehicle delivering the package to the user location may result in a decrease in delivery efficiency for the autonomous vehicle because too much time is taken for delivery of the package. Therefore, the control section may further acquire the planned travel route that is a route on which the autonomous vehicle is planned to travel, and transmit an instruction for cancelling delivery of the package, to the autonomous vehicle unless the user location is within a predetermined range from the planned travel route. In other words, if the user location is different from the basic delivery destination, the control section may transmit an instruction for delivering the package to the user location to the autonomous vehicle under the condition that the user location is within a predetermined range from the planned travel route. Consequently, it is possible to deliver the package to the user location to the extent that a decrease in delivery efficiency for the autonomous vehicle can be curbed. Note that the "predetermined range" mentioned here is a range determined such that even if the delivery destination of the package is changed from the basic delivery destination to the user location, no problem occurs in package delivery service, etc. Examples of such predetermined range include, e.g., a range in which a distance between the planned travel route and the user location is not longer than a predetermined distance, a range in which a distance between the basic delivery destination and the user location is not longer than a predetermined distance and a range in which an increase in time necessary for the change of the delivery destination of the package from the basic delivery destination to the user location is not longer than a predetermined length of time.

Also, where the user location is different from the basic delivery destination, a situation where the user rides in another autonomous vehicle that is different from the autonomous vehicle that delivers the package is conceivable. In such situation, the user location moves together with the other autonomous vehicle. Therefore, the control section may determine a meeting point and a meeting time of meeting between the autonomous vehicle that delivers the package and the other autonomous vehicle that the user rides in and transmit an instruction intended to cause the autonomous vehicle and the other autonomous vehicle to meet at the meeting point at the meeting time to the autonomous vehicle and the other autonomous vehicle. In such case, upon reception of the instruction from the control section, the autonomous vehicle and the other autonomous vehicle can meet at the meeting point at the meeting time. As a result, when the autonomous vehicle and the other autonomous vehicle meet, the package can be delivered from the autonomous vehicle to the user. Note that if the other autonomous vehicle that the user rides in is a vehicle that operates on a prescribed route according to a prescribed time schedule such as a transit bus, the meeting point and the meeting time may be determined based on the operation route and an operation time schedule of the other autonomous vehicle. Consequently, the package can be delivered from the autonomous vehicle to the user with no problem in operation of the other autonomous vehicle.

A specific embodiment of the present disclosure will be described below with reference to the drawings. Dimensions, materials, shapes, relative dispositions, etc., of the components described in the present embodiment are not intended to limit the technical scope of the disclosure only thereto unless specifically stated.

Embodiment

The present embodiment will be described in terms of an example in which the present disclosure is applied to a transportation service in which packages are delivered using an autonomous vehicle.

System Overview

FIG. 1 is a diagram illustrating a schematic configuration of a system that provides transportation services using an autonomous vehicle (hereinafter may also be referred to as "transportation system"). The system illustrated in FIG. 1 includes an autonomous vehicle 100 that autonomously travels according to a provided operation instruction and a server apparatus 200 that issues an operation instruction to the autonomous vehicle 100. Note that although in the example illustrated in FIG. 1, only one autonomous vehicle 100 is illustrated, a plurality of autonomous vehicles 100 may be included in the transportation system.

The autonomous vehicle 100 is a vehicle that can autonomously travel on a road. The autonomous vehicle 100 is, for example, a transit bus that transports users on a predetermined route, an on-demand taxi that operates on a route according to a request from a user, a package delivery vehicle that delivers a package to a designated delivery destination or a stay-type passenger transportation vehicle (for example, a vehicle with, e.g., a hotel facility or a work space provided inside) that operates on a route according to a request from a user. Each of the above types of autonomous vehicles 100 does not necessarily need to be a vehicle that no person other than passengers rides in. For example, service personnel who take care of passengers, security personnel who ensure security of the autonomous vehicle 100 and/or pickup and delivery personnel who load and unload packages may ride in the vehicle. Also, the autonomous vehicle 100 does not necessarily need to be a vehicle that can completely autonomously travel but may be a vehicle that allows driving personnel to drive or assists in driving the vehicle as the situation demands. Note that in the present example, a package delivery vehicle mainly intended to deliver a package to a designated delivery destination is taken as an example of the autonomous vehicle 100 to which the present disclosure is applied.

The server apparatus 200 is an apparatus that manages and controls operation of the autonomous vehicle 100 and corresponds to the "information processing apparatus" according to the present disclosure. For example, where the autonomous vehicle 100 is a package delivery vehicle, the server apparatus 200 acquires a delivery destination of each package and then transmits an operation instruction intended to cause to the autonomous vehicle 100 to "travel to a predetermined spot and deliver the package" to the autonomous vehicle 100. Consequently, upon reception of the operation instruction from the server apparatus 200, the autonomous vehicle 100 can travel toward the delivery destination of the package. Note that the operation instruction is not limited to one that designates a delivery destination of a package. For example, the server apparatus 200 can acquire a package pickup destination and transmit an operation instruction intended to cause the autonomous vehicle 100 to "travel to a predetermined spot and pick up a package" to the autonomous vehicle 100.

Also, the server apparatus 200 has a function that changes a delivery destination of a package according to a location, at a planned delivery time, of a user that receives the package (e.g., a recipient of the package, a family member of the recipient or a colleague of the recipient) (user location). For example, the server apparatus 200 acquires a user location that is a location, at a planned delivery time, of a user that receives a package (hereinafter may also be referred to as "receiving user") at a predetermined timing before the autonomous vehicle 100 arrives at a basic delivery destination that is an original delivery destination of the package (for example, a delivery destination designated when a procedure for sending the package was performed), and if the acquired user location is different from the basic delivery destination, transmits an instruction for changing the delivery destination of the package from the basic delivery destination to the user location to the autonomous vehicle 100.

System Configuration

Figure 2:
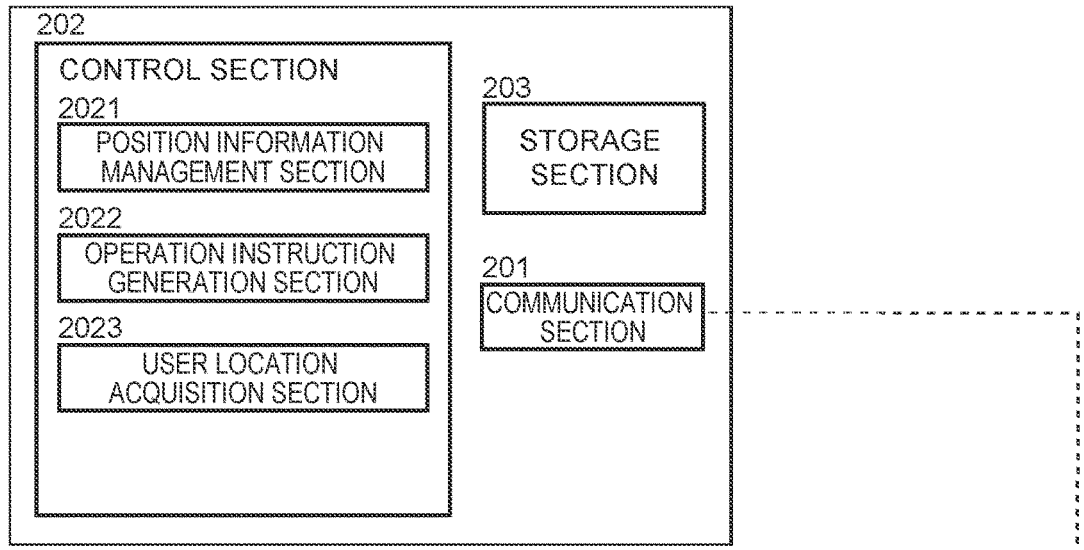
FIG. 2 is a block diagram schematically illustrating example configurations of the autonomous vehicle and a server apparatus.
Figure 2:
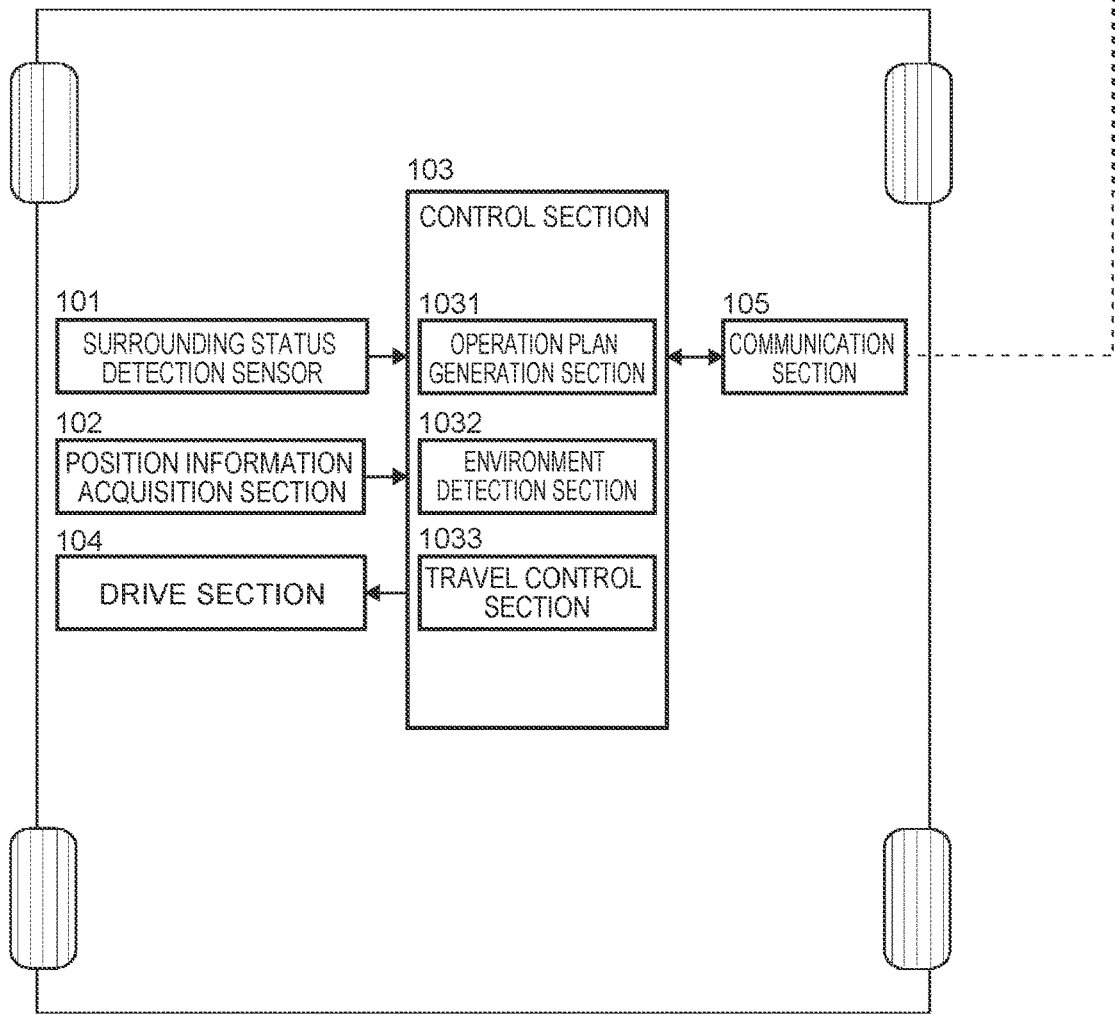

Next, components of the autonomous vehicle 100 in the present example will be described in detail. FIG. 2 is a block diagram schematically illustrating example configurations of the autonomous vehicle 100 and the server apparatus 200 illustrated in FIG. 1. Note that in the example illustrated in FIG. 2, only one autonomous vehicle 100 is illustrated but there may be a plurality of autonomous vehicles 100 subject to the control of the server apparatus 200.

As described above, the autonomous vehicle 100 is a vehicle that autonomously travels on a road according to an operation instruction acquired from the server apparatus 200. The autonomous vehicle 100 includes, e.g., a surrounding status detection sensor 101, a position information acquisition section 102, a control section 103, a drive section 104 and a communication section 105. The autonomous vehicle 100 in the present example is an electric vehicle to be driven with an electric motor as a prime mover. The prime mover of the autonomous vehicle 100 is not limited to an electric motor but may be an internal combustion engine or a hybrid mechanism of an internal combustion engine and an electric motor.

The surrounding status detection sensor 101 is means for sensing the surroundings of the vehicle and typically includes a stereo camera, a laser scanner, a LIDAR and/or a radar. Information acquired by the surrounding status detection sensor 101 is provided to the control section 103.

The position information acquisition section 102 is means for acquiring a current position of the autonomous vehicle 100 and typically includes, e.g., a GPS receiver. Note that the position information acquisition section 102 acquires a current position of the autonomous vehicle 100 in a predetermined cycle and provides information on the acquired current position to the control section 103. In response, each time the control section 103 receives position information from the position information acquisition section 102, the control section 103 transmits the position information to the server apparatus 200. In other words, the position information of the autonomous vehicle 100 is transmitted from the autonomous vehicle 100 to the server apparatus 200 in a predetermined cycle. Consequently, the server apparatus 200 can grasp the current position of the autonomous vehicle 100.

The drive section 104 is means for making the autonomous vehicle 100 travel based on an instruction generated by a travel control section 1033. The drive section 104 includes, for example, a prime mover (e.g., an internal combustion engine, an electric motor or a hybrid mechanism of an internal combustion engine and an electric motor), a braking device and a steering device.

The communication section 105 is communication means for connecting the autonomous vehicle 100 to a network. In the present embodiment, the communication section 105 can perform communication with another apparatus (for example, the server apparatus 200) via a network using a mobile communication service such as 3G (3rd Generation) or LTE (Long Term Evolution). Note that the communication section 105 may further include communication means for vehicle-to-vehicle communication with another autonomous vehicle 100. For example, the communication section 105 transmits, e.g., current position information of the relevant vehicle, the current position information being acquired by the position information acquisition section 102, or an operation plan generated by an operation plan generation section 1031 to the server apparatus 200. Also, each time delivery of a package is completed, the communication section 105 transmits information on the completion of delivery of the package to the server apparatus 200.

The control section 103 is a computer that controls operation of the autonomous vehicle 100 based on information acquired from the surrounding status detection sensor 101 or controls a travelling status of the autonomous vehicle 100 according to an operation instruction from the server apparatus 200. The control section 103 includes, for example, a microcomputer. The control section 103 of the present example includes the operation plan generation section 1031, an environment detection section 1032 and the travel control section 1033 as functional modules. Each functional module may be implemented by causing a CPU (central processing unit) to execute a program stored in storage means such as a ROM (read-only memory) (none of these components illustrated).

The operation plan generation section 1031 acquires an operation instruction from the server apparatus 200 and generates an operation plan for the relevant vehicle. In the present embodiment, "operation plan" refers to data prescribing a route for the autonomous vehicle 100 to travel and processing to be performed by the autonomous vehicle 100 for a part or an entirety of the route. Examples of the data included in the operation plan include the following.

(1) Data representing a route on which the autonomous vehicle 100 is planned to travel (planned travel route) by means of a collection of road links. The "planned travel route" mentioned here may be generated by, for example, the operation plan generation section 1031 based on a delivery start site and a delivery destination provided by the operation instruction from the server apparatus 200, with reference to map data stored in a storage device mounted in the autonomous vehicle 100. Also, the "planned travel route" may be generated using an external service or may be provided from the server apparatus 200. (2) Data representing processing to be performed by the autonomous vehicle 100 at an arbitrary point on the planned travel route. The "arbitrary spot" mentioned here is, for example, a delivery start site such as a distribution center, a package delivery destination or a package pickup destination. Then, examples of the processing to be performed by the autonomous vehicle 100 at an arbitrary point such as mentioned above include "loading a package" and "unloading a package", but is not limited to these examples. (3) Data representing a planned time of departure or arrival of the autonomous vehicle 100 from or at an arbitrary point on the planned travel route. Examples of the planned time of departure or arrival of the autonomous vehicle 100 from or at an arbitrary point on the planned travel route include "planned time of departure from a delivery start site", "planned time of arrival at a delivery destination" and "planned time for arrival at a pickup destination", but are not limited to these examples.

Here, information on the operation plan generated by the operation plan generation section 1031 is transmitted to the server apparatus 200 via the communication section 105. In other words, the operation plan information is transmitted from the autonomous vehicle 100 to the server apparatus 200 when the operation plan is generated by the autonomous vehicle 100. Consequently, it becomes possible for the server apparatus 200 to grasp the operation plan of the autonomous vehicle 100.

The environment detection section 1032 detects an environment surrounding the vehicle based on the data acquired by the surrounding status detection sensor 101. Examples of the subject of the detection include, e.g., the number and positions of lanes, the number and positions of vehicles present around the relevant vehicle, the number and positions of obstacles present around the relevant vehicle (for example, pedestrians, bicycles, structures and buildings), a structure of the road and road signs but are not limited to these examples. The subject of the detection may be anything that is necessary for autonomous traveling. Also, the environment detection section 1032 may track a detected object. For example, a relative speed of an object detected one step before may be obtained from a difference between coordinates of the object and current coordinates of the object.

The travel control section 1033 controls travelling of the relevant vehicle based on the operation plan generated by the operation plan generation section 1031, the environment data generated by the environment detection section 1032 and the position information of the relevant vehicle acquired by the position information acquisition section 102. For example, the travel control section 1033 makes the relevant vehicle travel along the planned travel route generated by the operation plan generation section 1031 and also makes the relevant vehicle travel so as to prevent any obstacle from falling within a predetermined safe area with the relevant vehicle as a center. Note that for a method for making the vehicle autonomously travel, a known method can be employed. The travel control section 1033 also has a function that controls travelling of the autonomous vehicle 100 according to an instruction from the server apparatus 200.

Next, the server apparatus 200 will be described. The server apparatus 200 is an apparatus that manages travelling positions of the autonomous vehicle 100 subject to the control of the server apparatus 200 and transmits an operation instruction. The server apparatus 200 also has a function that changes a delivery destination of a package according to a user location, which is a location, at a planned delivery time, of a receiving user. Such server apparatus 200 includes a communication section 201, a control section 202 and a storage section 203. As with the communication section 105, the communication section 201 is a communication interface for performing communication with the autonomous vehicle 100 via a network.

The control section 202 is means for performing control of the server apparatus 200. The control section 202 includes, for example, a CPU. The control section 202 in the present example includes a position information management section 2021, an operation instruction generation section 2022 and a user location acquisition section 2023 as functional modules. Each of the functional modules may be implemented by causing the CPU to execute a program stored in storage means such as a ROM (none of these components illustrated).

The position information management section 2021 manages positions of the autonomous vehicles 100 subject to the control of the server apparatus 200. More specifically, the position information management section 2021 receives position information transmitted from each autonomous vehicle 100 in a predetermined cycle and stores the received position information in the later-described storage section 203 in association with a time and a date.

Upon receipt of a vehicle dispatch request for dispatch of an autonomous vehicle 100 from the outside, the operation instruction generation section 2022 determines an autonomous vehicle 100 to be dispatched and generates an operation instruction according to the vehicle dispatch request. Examples of the vehicle dispatch request include the following but may include others. (1) Cargo/passenger transportation request: a request for transporting cargo or a passenger with a departure point and a destination point or a travel route designated. (2) Request for dispatch of an autonomous vehicle having a particular function: a request for dispatch of an autonomous vehicle 100 having a function such as an accommodation facility (hotel) for a passenger or a work space (for example, a private office or a business office) for a passenger. The autonomous vehicle 100 may be dispatched to a single spot or a plurality of spots. If the autonomous vehicle 100 is dispatched to a plurality of spots, the autonomous vehicle 100 may provide a service at each of the plurality of spots.

The above vehicle dispatch request is acquired from, for example, a user through, e.g., the Internet or a telephone. Note that a source of transmission of the vehicle dispatch request is, for example, a business entity that performs operation of the autonomous vehicles 100, a transportation service provider that undertakes transportation of cargo or passengers or a user wishing to ride in an autonomous vehicle 100. The autonomous vehicle 100 to be a destination of transmission of the operation instruction is determined according to, e.g. position information of each vehicle acquired by the position information management section 2021 and specifications of each vehicle grasped in advance by the server apparatus 200 (what internal/external equipment the vehicle has). Then, upon determination of the autonomous vehicle 100 as the destination of transmission of the operation instruction, the operation instruction generated by the operation instruction generation section 2022 is transmitted to the autonomous vehicle 100 by the communication section 201.

Also, if a user location acquired by the later-described user location acquisition section 2023 is different from a basic delivery destination, as long as the user location is within a predetermined range from an original planned travel route, the operation instruction generation section 2022 transmits an instruction for delivering a package to the user location, in other words, an instruction for changing a delivery destination of the package from the basic delivery destination to the user location to the autonomous vehicle 100. On the other hand, if the user location is different from the basic delivery destination, the operation instruction generation section 2022 transmits an instruction for cancelling delivery of the package to the autonomous vehicle 100 unless the user location is within the predetermined range from the initial planned travel route. The "predetermined range" mentioned here is a range determined such that even if the delivery destination of the package is changed from the basic delivery destination to the user location, no problem occurs in package delivery service, etc., and is, for example, a range in which a distance between the planned travel route and the user location is within a predetermined distance, a range in which a distance between the basic delivery destination and the user location is within a predetermined distance or a range in which an increase in required time due to the change of the delivery destination of the package from the basic delivery destination to the user location is not larger than a predetermined length of time.

The user location acquisition section 2023 acquires the user location at a predetermined timing before the autonomous vehicle 100 arrives at the basic delivery destination. As described above, the "user location" mentioned here is not the location of the receiving user at the predetermined timing but the location of the receiving user at a planned delivery time. Such acquisition of the user location is performed by, for example, the server apparatus 200 communicating with a user terminal carried by the receiving user through, e.g., the Internet. Note that the user location may be acquired by an operator or the like inputting user location information obtained through a telephone conversation with the receiving user to the server apparatus 200. Note that the "predetermined timing" mentioned here is, e.g., a timing at which time left before the planned delivery time of the package becomes no more than a predetermined length of time, a timing at which a travelling position of the autonomous vehicle 100 enters a range that is a predetermined distance from the basic delivery destination or a timing at which the autonomous vehicle 100 departs from a predetermined departure point (for example, a distribution center or a delivery destination of a package delivered last) toward the basic delivery destination. The user location acquired by the above-described method is provided from the user location acquisition section 2023 to the operation instruction generation section 2022.

Figures 3, 4:
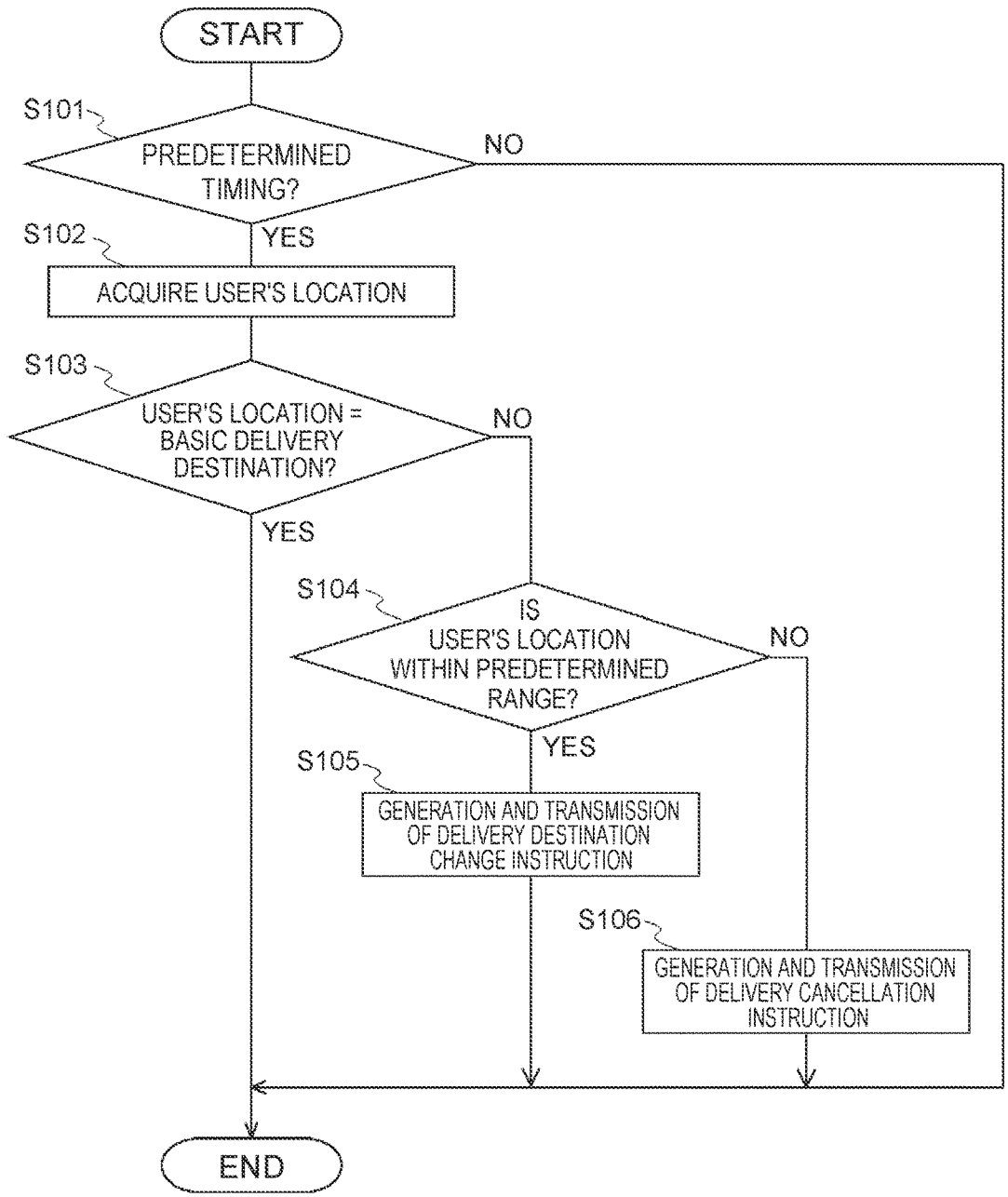
FIG. 3 is a diagram illustrating an example configuration of an operation plan information table.
FIG. 4 is a flowchart illustrating the flow of processing performed in the server apparatus when managing operation of the autonomous vehicle used as a package delivery vehicle in an embodiment.

The storage section 203 is means for storing information and includes a storage medium such as a RAM, a magnetic disk or a flash memory. In the storage section 203 in the present example, operation plan information pieces for the individual autonomous vehicles 100 are stored and the operation plan information pieces and identification information pieces of the individual autonomous vehicles 100 are associated with each other. Here, an example configuration of the operation plan information stored in the storage section 203 will be described with reference to FIG. 3. FIG. 3 is a diagram illustrating a configuration of an operation plan information table. Note that information pieces registered in the operation plan information table are not limited to those in the example illustrated in FIG. 3 and appropriate addition, change and deletion of fields are possible. The operation plan information table illustrated in FIG. 3 includes fields of vehicle ID, travel route, position information, reception time and date, start time, package ID, delivery destination, contact information, delivery time, and status. Vehicle identification information pieces for identifying respective autonomous vehicles 100 are input to vehicle ID fields. Information pieces indicating respective planned travel routes determined when the operation plan generation sections 1031 of the autonomous vehicles 100 generated respective operation plans are input to travel route fields. Position information pieces received by the position information management section 2021 from the respective autonomous vehicles 100 are input to position information fields. Each of the position information pieces input to the position information fields may be, for example, information indicating an address of a site at which the relevant autonomous vehicle 100 is located or information indicating coordinates on a map (a latitude and a longitude), of the site at which the relevant autonomous vehicle 100 is located. Respective times and dates of reception of the position information pieces input to the position information fields, by the position information management section 2021 from the respective autonomous vehicles 100 are input to reception time/day fields. Note that each of the information pieces input to the position information fields and the reception time/day fields is updated each time the position information management section 2021 receives a position information piece from the relevant autonomous vehicle 100 (in the above-mentioned predetermined cycle). Planned times for the respective autonomous vehicles 100 to depart from respective delivery start sites are input to start time fields. Package identification information pieces for identifying packages to be delivered by the respective autonomous vehicles 100 are input to package ID fields. Information pieces indicating basic delivery destinations of respective packages are input to delivery destination fields. The information piece input to each of the delivery destination fields may be information indicating an address of a site at which the relevant basic delivery destination is located or information indicating coordinates on a map (a latitude and a longitude), of the site at which the relevant basic delivery destination is located. Information pieces indicating contact information pieces of receiving users of the respective packages (for example, e-mail addresses of user terminals carried by the receiving users) are input to contact information fields. Planned times of arrival of the respective autonomous vehicles 100 at the delivery destinations of the respective packages are input to planned delivery time fields. Information pieces each indicating whether or not deliver of the relevant package is completed are input to status fields. For example, if delivery of the package has not been completed, "under delivery" is input, and if delivery of the package has been completed, "delivered" is input. Note that in the example illustrated in FIG. 3, information pieces relating to two packages are associated with one vehicle identification information piece. The above indicates that two packages are delivered by one autonomous vehicle 100. One or three or more information pieces of packages may be associated with one vehicle identification information piece. In short, it is only necessary that the number of package information pieces, the number corresponding to the number of packages to be delivered by an autonomous vehicle 100, be associated with vehicle identification information of the autonomous vehicle 100. Also, although in the example illustrated in FIG. 3, the delivery destinations of the two packages are different from each other, the delivery destinations of the two packages may be the same.

Flow of Processing

Here, the flow of processing performed in the server apparatus 200 when operation of the autonomous vehicle 100 used as a package delivery vehicle is managed will be described with reference to FIG. 4. FIG. 4 is a flowchart illustrating the flow of processing repeatedly performed in the server apparatus 200 when an autonomous vehicle 100 used as a package delivery vehicle is made to operate according to an operation plan.

In FIG. 4, the user location acquisition section 2023 of the server apparatus 200 determines whether or not a current point of time is a predetermined timing (timing for acquiring a user location) (step S101). For example, the user location acquisition section 2023 accesses the operation plan information table in the storage section 203 and reads a planned delivery time of a package to be delivered next by the autonomous vehicle 100. Then, if the current point of time falls within a range that is within a predetermined length of time before the planned delivery time, the user location acquisition section 2023 determines that the current point of time is the predetermined timing (affirmative determination in step S101). As another method, if a travelling position of the autonomous vehicle 100 falls within a range that is not longer than a predetermined distance from a basic delivery destination of the package to be delivered next, the user location acquisition section 2023 may determine that the current point of time is the predetermined timing. In such case, the user location acquisition section 2023 first accesses the operation plan information table and reads a planned travel route registered in the relevant travel route field, position information registered in the relevant position information field and basic delivery destination information registered in a delivery destination field for the package to be delivered next. Subsequently, the user location acquisition section 2023 performs an arithmetic operation to obtain a distance between the position of the autonomous vehicle 100 and the basic delivery destination based on the planned travel route, the position information and the basic delivery destination information. Then, if the distance between the position of the autonomous vehicle 100 and the basic delivery destination is not longer than the predetermined distance, the user location acquisition section 2023 may determine that the current point of time is the predetermined timing. Also, the user location acquisition section 2023 may determine that the current point of time is the predetermined timing, at a timing for departure of the autonomous vehicle 100 from a predetermined departure point. In this case, if the package to be delivered next is a package to be delivered first after departure from a delivery start site, the user location acquisition section 2023 may determine that the current point of time is the predetermined timing, at the timing for departure of the autonomous vehicle 100 from the delivery start site (that is, a timing at which the current time reaches a time registered in the relevant start time field of the operation plan information table). Also, the package to be delivered next is a package to be delivered second or later after departure from the delivery start site, the user location acquisition section 2023 may determine that the current point of time is the predetermined timing, at a timing of reception of information of completion of delivery of a package delivered last from the autonomous vehicle 100.

If a negative determination is made in step S101 above, the processing flow ends temporarily. On the other hand, if an affirmative determination is made in step S101 above, the user location acquisition section 2023 acquires a user location for the package to be delivered next (step S102). More specifically, the user location acquisition section 2023 accesses the operation plan information table and reads contact information (e.g., an e-mail address of a user terminal carried by the relevant receiving user) registered in the relevant contact information field for the package to be delivered next and a planned delivery time registered in the relevant delivery time field. Subsequently, the user location acquisition section 2023 transmits information intended to inquire the location, at the planned delivery time, of the receiving user to the user terminal of the receiving user. In response, information indicating the location, at the planned delivery time, of the receiving user is transmitted from the user terminal to the server apparatus 200, whereby the user location is acquired.

The user location acquisition section 2023 determines whether or not the user location acquired in step S102 above is the same as the basic delivery destination (step S103). If the user location is the same as the basic delivery destination (affirmative determination in step S103), the processing flow ends. In that case, the autonomous vehicle 100 delivers the package to be delivered next to the basic delivery destination. Consequently, the receiving user can receive the package at the basic delivery destination. On the other hand, if the user location is different from the basic delivery destination (negative determination in step S103), the user location acquisition section 2023 determines whether or not the user location is within a predetermined range from the planned travel route of the autonomous vehicle 100 (step S104). For example, the user location acquisition section 2023 first reads the planned travel route registered in the relevant travel route field in the operation plan information table and performs an arithmetic operation to obtain a distance between the planned travel route and the user location. The "distance between the planned travel route and the user location" mentioned here is a length of a shortest path from among paths connecting the planned travel route and the user location. Subsequently, if the distance between the planned travel route and the user location is not longer than a predetermined distance, the user location acquisition section 2023 may determine that the user location is within the predetermined range from the planned travel route of the autonomous vehicle 100. The "predetermined distance" mentioned here is a distance determined such that even if the delivery destination of the package is changed from the basic delivery destination to the user location, no problem occurs in package delivery service, etc. In other words, the "predetermined distance" is a distance determined such that even if the delivery destination of the package is changed from the basic delivery destination to the user location, the autonomous vehicle 100 can arrive at the user location at a time that is substantially the same as the planned delivery time. As another method, if a distance between the basic delivery destination and the user location is not longer than a predetermined distance, the user location acquisition section 2023 may determine that the user location is within the predetermined range from the planned travel route of the autonomous vehicle 100. Also, if an increase in required time due to the change of the delivery destination of the package from the basic delivery destination to the user location is not larger than a predetermined length of time, the user location acquisition section 2023 may determine that the user location is within the predetermined range from the planned travel route of the autonomous vehicle 100.

If an affirmative determination is made in step S104 above, the operation instruction generation section 2022 of the server apparatus 200 generates an instruction for delivering the package to be delivered next to the user location acquired in step S102 above and transmits the generated instruction to the autonomous vehicle 100 (step S105). In other words, the operation instruction generation section 2022 generates an instruction intended to change the delivery destination of the packaged to be delivered next from the basic delivery destination to the user location (delivery destination change instruction) and transmits the generated delivery destination change instruction to the autonomous vehicle 100. Upon reception of such delivery destination change instruction, the operation plan generation section 1031 of the autonomous vehicle 100 changes the planned travel route of the relevant vehicle from a route including the basic delivery destination to a route including the user location. Then, the travel control section 1033 of the autonomous vehicle 100 makes the relevant vehicle travel along the changed planned travel route. Consequently, the autonomous vehicle 100 can deliver the package to be delivered next to the user location. Therefore, even where the receiving user moves from the basic delivery destination, the receiving user can receive the package at a destination of the movement of the receiving user as long as such destination is within the predetermined range from the original planned travel route. As a result, the need for the autonomous vehicle 100 to perform redelivery is eliminated and restriction of movement of the user is curbed.

If a negative determination is made in step S104 above, the operation instruction generation section 2022 of the server apparatus 200 generates an instruction for cancelling delivery of the package to be delivered next (delivery cancellation instruction) and transmits the generated delivery cancellation instruction to the autonomous vehicle 100 (step S106). Upon reception of the delivery cancellation instruction, the operation plan generation section 1031 of the autonomous vehicle 100 changes the planned travel route of the relevant vehicle to a route toward a delivery destination of a package to be delivered after the next without passing through the delivery destination of the package to be delivered next. Then, the travel control section 1033 of the autonomous vehicle 100 makes the autonomous vehicle 100 travel along the changed planned travel route. Consequently, the autonomous vehicle 100 can deliver another package without travelling through a basic delivery destination at which no receiving user is present or a user location that is excessively distant from the original planned travel route. Therefore, where the receiving user moves from the basic delivery destination, if a destination of the movement of the receiving user is not located within the predetermined range from the original planned travel route, it is possible to curb an impact on delivery of other packages attributable to the autonomous vehicle 100 travelling via the user location.

According to the above-described example, where a package is delivered using the autonomous vehicle 100, even where a receiving user moves from a basic delivery destination, the package can be delivered to a destination of the movement of the receiving user. As a result, restricting movement of the receiving user and the autonomous vehicle 100 performing redelivery are curbed. Therefore, it is possible to curb a decrease in convenience for the user or a decrease in delivery efficiency for the autonomous vehicle 100. Also, where the receiving user moves from the basic delivery destination, if a destination of the movement of the receiving user is excessively distant from the original planned travel route, delivery of a package addressed to the receiving user is cancelled, curbing causing an obstacle to delivery of other packages. Therefore, the present example enables curving a decrease in convenience for the receiving user and a decrease in delivery efficiency for the autonomous vehicle 100 while keeping a balance between the convenience for the receiving user and the delivery efficiency for the autonomous vehicle 100.

Alteration of Embodiment

Although the above embodiment has been described in terms of an example based on the premise that a user location is an immobile site, a case where a user location is another autonomous vehicle such as a transit bus or an on-demand taxi is conceivable. In such case, it is necessary to cause the autonomous vehicle that delivers a package and the other autonomous vehicle that the receiving user rides in to meet at a proper site to deliver the package.

Therefore, the server apparatus 200 is configured so as to, if a user location is another autonomous vehicle, determine a meeting point and a meeting time of meeting between the autonomous vehicle 100 that performs delivery of a package and the other autonomous vehicle that a receiving user rides in and transmit an instruction for causing both vehicles to meet at the determined meeting point at the determined meeting time to both vehicles. Consequently, even if a user location is the other autonomous vehicle, it is possible to deliver a package to the receiving user.

Figure 5:
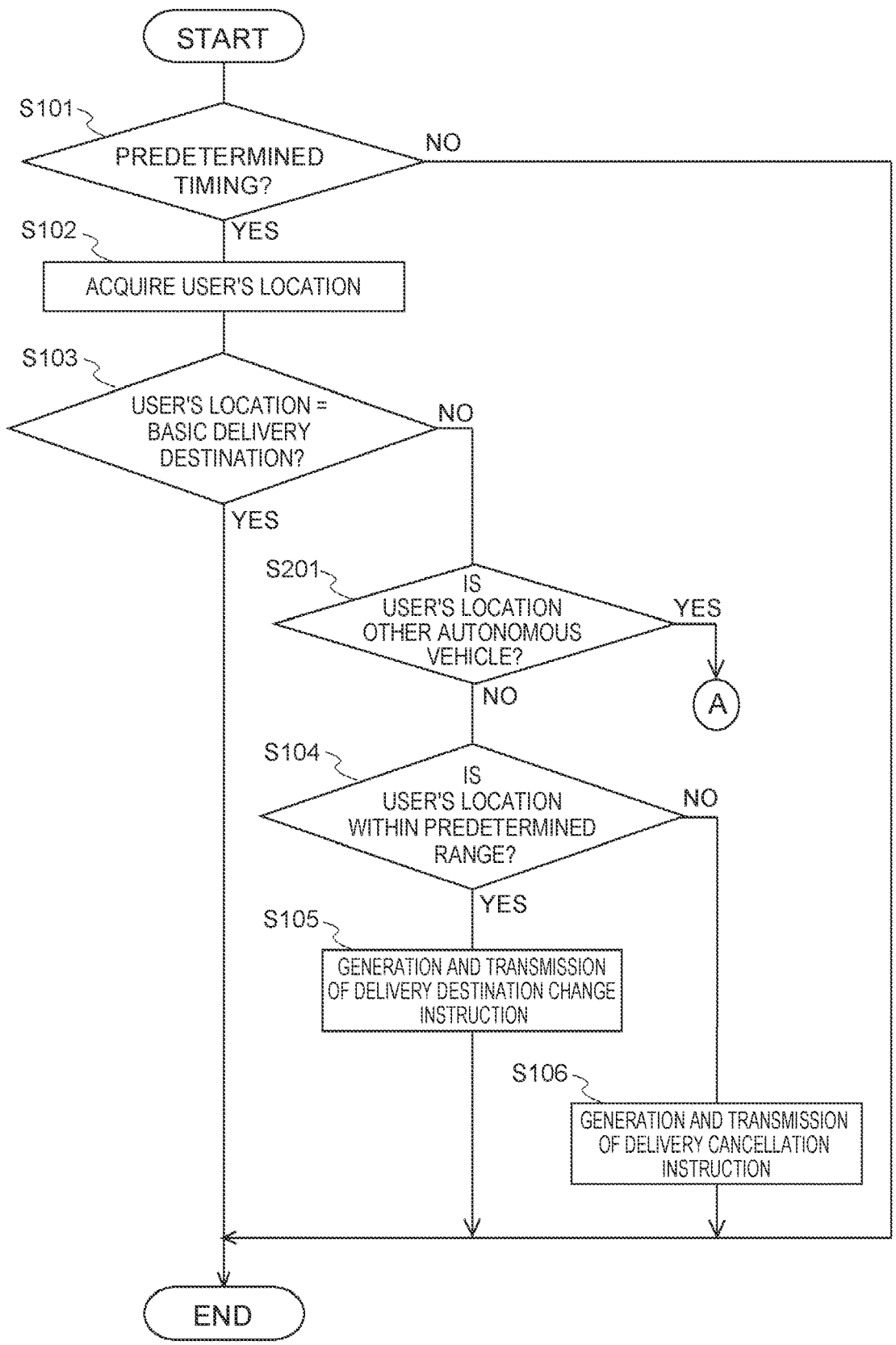
FIG. 5 is a first flowchart illustrating the flow of processing performed in the server apparatus when managing operation of the autonomous vehicle used as a package delivery vehicle in an alteration.
Figure 6:
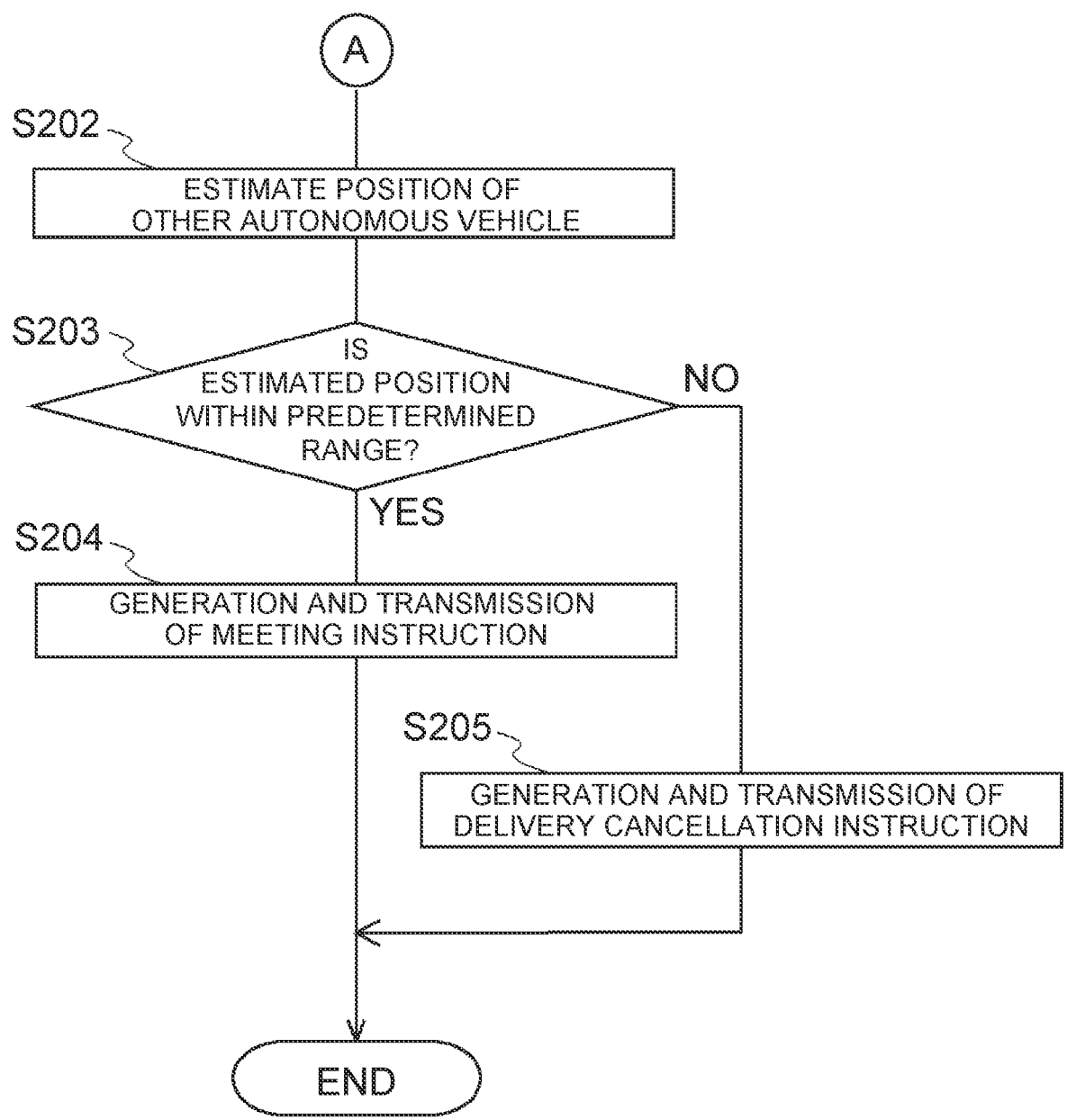
FIG. 6 is a second flowchart illustrating the flow of processing performed in the server apparatus when managing operation of the autonomous vehicle used as a package delivery vehicle in the alteration.

Here, in the present alternation, the flow of processing performed in the server apparatus 200 will be described with reference to FIGS. 5 and 6. FIGS. 5 and 6 are flowcharts illustrating the flow of processing repeatedly performed in the server apparatus 200 when making the autonomous vehicle 100 used as a package delivery vehicle operate according to an operation plan. Note that in FIGS. 5 and 6, processing steps that are similar to those in FIG. 4 are provided with reference numerals that are the same as those in FIG. 4.

First, in FIG. 5, if a negative determination is made in step S103, a user location acquisition section 2023 of the server apparatus 200 determines whether or not a user location acquired in step S102 is another autonomous vehicle (step S201). If a negative determination is made in step S201, as described in the above example, the server apparatus 200 performs processing in steps S104 to S106. On the other hand, if an affirmative determination is made in step S201, the processing performed in the server apparatus 200 proceeds to the processing flow in FIG. 6.

In the processing flow in FIG. 6, the user location acquisition section 2023 of the server apparatus 200 estimates a position, at a planned delivery time of a package, of the other autonomous vehicle (step S202). For example, the user location acquisition section 2023 may estimate the position, at the planned delivery time, of the other autonomous vehicle based on, e.g., the position of the other autonomous vehicle, a travelling speed of the other autonomous vehicle and/or the current time. Note that if the other autonomous vehicle is a vehicle that operates on a prescribed route according to a prescribed time schedule like a transit bus, respective positions of stops at which the other autonomous vehicle is planned to stop before and after the planned delivery time may be acquired.

The user location acquisition section 2023 determines whether or not the position of the other autonomous vehicle estimated in step S202 above (estimated position) is within a predetermined range from a planned travel route of the autonomous vehicle 100 that delivers the package (step S203). A procedure for the determination in such case is similar to that in step S104 above. However, it is assumed that the "predetermined range" in the present alteration is set to be a range in which the autonomous vehicle 100 that delivers the package can arrive at the estimated position by the planned delivery time (or a time of arrival of the other autonomous vehicle at the stop that is the estimated position).

If an affirmative determination is made in step S203 above, an operation instruction generation section 2022 generates a meeting instruction and transmits the generated meeting instruction to the other autonomous vehicle and the autonomous vehicle 100 (step S204). The "meeting instruction" mentioned here is an instruction for causing the other autonomous vehicle and the autonomous vehicle 100 to meet at the meeting point at the meeting time. In the present alteration, it is assumed that: as the meeting time, the planned delivery time of the package is used; and as the meeting point, the estimated position is used. Upon reception of such meeting instruction, the operation plan generation section 1031 of the autonomous vehicle 100 changes a planned travel route for the relevant vehicle from a route including a basic delivery destination to a route including the meeting point. Then, the travel control section 1033 of the autonomous vehicle 100 causes the relevant vehicle to travel along the changed planned travel route. Consequently, the autonomous vehicle 100 can deliver the package to the meeting point. On the other hand, upon reception of the meeting instruction, in the other autonomous vehicle, an operation plan for moving to the meeting point by the meeting time is generated and the other autonomous vehicle is made to travel according to the operation plan. Consequently, the other autonomous vehicle can wait for meeting with the autonomous vehicle 100 at the meeting point. Then, upon the autonomous vehicle 100 and the other autonomous vehicle meeting at the meeting point at the meeting time, the package can be delivered from the autonomous vehicle 100 to the receiving user. Note that if the autonomous vehicle 100 and the other autonomous vehicle have respective mechanisms that can be joined to each other while traveling, delivery of the package may be performed by both vehicles being joined to each other while traveling.

The above-described alteration enables provision of effects that are similar to those of the above-described embodiment even if a user location is another autonomous vehicle.

Others

Note that the above-described embodiment is definitely a mere example and the present disclosure can be carried out with arbitrary changes made thereto without departing from the spirit of the disclosure.

In addition, any combination of the processing and means described in the present disclosure is possible as long as such combination has no technical contradiction. Furthermore, processing described as being performed by a single apparatus may be shared by a plurality of apparatuses. Alternatively, processes described as being performed by different apparatuses may be performed by a single apparatus. In the computer system, what hardware configuration is employed for implementing each function can flexibly be changed.

Also, the present disclosure can be carried out by providing an information processing program for implementing the functions described in the above embodiment to a computer and causing one or more processors included in the computer to read and execute the information processing program. The information processing program may be provided to the computer via a non-transitory storage medium that is connectable to a system bus of the computer or may be provided to the computer via a network. The non-transitory storage medium is a recording medium that can electrically, magnetically, optically, mechanically or chemically store information such as data and programs and allows such information to be read via, e.g., a computer, and is, for example, a medium such as any type of disk, for example, a magnetic disk (a floppy (registered trademark) disk or a hard disk drive (HDD)) or an optical disc (a CD-ROM, a DVD or a Blu-ray Disc), a read-only memory (ROM), a random access memory (RAM), an EPROM, an EEPROM, a magnetic card, a flash memory, an optical card or an SSD (solid-state drive).

What is claimed is:

1. An information processing apparatus for managing operation of an autonomous vehicle that delivers a package, the apparatus comprising a control section that:

acquires a planned travel route that is a route on which the autonomous vehicle is planned to travel, before the autonomous vehicle arrives at a basic delivery destination that is an original delivery destination of the package, acquires a location, at a planned delivery time of the package, of a user that receives the package, and where the location is different from the basic delivery destination, transmits an operation instruction to the autonomous vehicle to cause the autonomous vehicle to deliver the package to the location, and transmits an operation instruction to the autonomous vehicle to cancel delivery of the package where the location is not within a predetermined range from the planned travel route.

2. The information processing apparatus according to claim 1, wherein where the location is different from the basic delivery destination and the location is another autonomous vehicle that is different from the autonomous vehicle that delivers the package, the control section determines a meeting point and a meeting time of meeting between the autonomous vehicle and the other autonomous vehicle and transmits an instruction intended to cause the autonomous vehicle and the other autonomous vehicle to meet at the meeting point at the meeting time to the autonomous vehicle and the other autonomous vehicle.

3. The information processing apparatus according to claim 1, wherein the control section acquires the location at a timing at which time left before the planned delivery time of the package becomes no more than a predetermined length of time.

4. The information processing apparatus according to claim 1, wherein the control section acquires the location at a timing at which a position of the autonomous vehicle enters a range that is a predetermined distance from the basic delivery destination.

5. The information processing apparatus according to claim 1, wherein the control section acquires the location at a timing at which the autonomous vehicle departs from a predetermined departure point toward the basic delivery destination.

6. An information processing method for managing operation of an autonomous vehicle that delivers a package, the method comprising causing a computer to perform steps of:

acquiring a planned travel route that is a route on which the autonomous vehicle is planned to travel, before the autonomous vehicle arrives at a basic delivery destination that is an original delivery destination of the package, acquiring a location, at a planned delivery time of the package, of a user that receives the package and a step of, where the location is different from the basic delivery destination, transmitting an operation instruction to the autonomous vehicle to cause the autonomous vehicle to deliver the package to the location and transmitting an operation instruction to the autonomous vehicle to cancel delivery of the package where the location is not within a predetermined range from the planned travel route.

7. An information processing program for managing operation of an autonomous vehicle that delivers a package, the program causing a computer to perform a steps of;

acquiring a planned travel route that is a route on which the autonomous vehicle is planned to travel, before the autonomous vehicle arrives at a basic delivery destination that is an original delivery destination of the package, acquiring a location, at a planned delivery time of the package, of a user that receives the package and a step of, where the location is different from the basic delivery destination, transmitting an operation instruction to the autonomous vehicle to cause the autonomous vehicle to deliver the package to the location and transmitting an operation instruction to the autonomous vehicle to cancel delivery of the package where the location is not within a predetermined range from the planned travel route.

* * * * *